(12) United States Patent
Mehrnia et al.

(10) Patent No.: US 10,938,465 B1
(45) Date of Patent: Mar. 2, 2021

(54) CHANNEL AGGREGATION DIGITAL BEAMFORMING

(71) Applicant: Space Exploration Technologies Corp., Hawthorne, CA (US)

(72) Inventors: Alireza Mehrnia, Tustin, CA (US); Masoud Kahrizi, Irvine, CA (US); Ka Shun Carson Pun, Irvine, CA (US); Omid Nasiby, Laguna Niguel, CA (US); Alex Ahmad Mirzaei, Tustin, CA (US)

(73) Assignee: SPACE EXPLORATION TECHNOLOGIES CORP., Hawthorne, CA (US)

( * ) Notice: Subject to any disclaimer, the term of this patent is extended or adjusted under 35 U.S.C. 154(b) by 0 days.

(21) Appl. No.: 16/865,400

(22) Filed: May 3, 2020

Related U.S. Application Data

(60) Provisional application No. 62/847,749, filed on May 14, 2019.

(51) Int. Cl.
| | |
|---|---|
| *H04B 7/02* | (2018.01) |
| *H04B 7/06* | (2006.01) |
| *H04W 72/04* | (2009.01) |
| *H04B 7/08* | (2006.01) |

(52) U.S. Cl.
CPC ......... *H04B 7/0617* (2013.01); *H04B 7/0837* (2013.01); *H04W 72/046* (2013.01)

(58) Field of Classification Search
CPC .. H04B 7/0617; H04B 7/0837; H04W 72/046
USPC ........................................................ 375/267
See application file for complete search history.

(56) References Cited

U.S. PATENT DOCUMENTS

| | | | |
|---|---|---|---|
| 2019/0058530 A1* | 2/2019 | Rainish | H04B 17/12 |
| 2019/0089434 A1* | 3/2019 | Rainish | H04B 7/086 |
| 2019/0109629 A1* | 4/2019 | Park | H04B 7/0456 |
| 2020/0204244 A1* | 6/2020 | Hajimiri | H04B 7/0617 |

* cited by examiner

*Primary Examiner* — Don N Vo
(74) *Attorney, Agent, or Firm* — Polsinelli P.C.

(57) ABSTRACT

In an embodiment, an apparatus includes a first plurality of digital beamformers associated with a first channel; a second plurality of digital beamformers associated with a second channel different from the first channel; a channel combiner, electrically coupled to the first and second plurality of digital beamformers, and configured to generate a combined channel comprising an aggregation of the encoded first plurality of data beams and the encoded second plurality of data beams, wherein the combined channel has a bandwidth that is a function of a bandwidth of one or both of the first or second channel; and a radio frequency (RF) transmission section, electrically coupled to the channel combiner, and configured to generate an output signal to be provided to a transmitting antenna based on the combined channel, wherein the RF transmission section includes a digital-to-analog converter (DAC) and a mixer.

22 Claims, 10 Drawing Sheets

US 10,938,465 B1

CHANNEL AGGREGATION DIGITAL BEAMFORMING

CROSS-REFERENCE TO RELATED APPLICATION

The present application claims priority to U.S. Provisional Patent Application No. 62/847,749 filed May 14, 2019 entitled "Channel Aggregation Digital Beamforming," the contents of which is hereby incorporated by reference in its entirety.

BACKGROUND

An antenna (such as a dipole antenna) typically generates radiation in a pattern that has a preferred direction. For example, the generated radiation pattern is stronger in some directions and weaker in other directions. Likewise, when receiving electromagnetic signals, the antenna has the same preferred direction. Signal quality (e.g., signal to noise ratio or SNR), whether in transmitting or receiving scenarios, can be improved by aligning the preferred direction of the antenna with a direction of the target or source of the signal. However, it is often impractical to physically reorient the antenna with respect to the target or source of the signal. Additionally, the exact location of the source/target may not be known. To overcome some of the above shortcomings of the antenna, a phased array antenna can be formed from a set of antenna elements to simulate a large directional antenna. An advantage of a phased array antenna is its ability to transmit and/or receive signals in a preferred direction (e.g., the antenna's beamforming ability) without physical repositioning or reorientating.

It would be advantageous to configure phased array antennas having increased bandwidth while maintaining a high ratio of the main lobe power to the side lobe power. Likewise, it would be advantageous to configure phased array antennas and associated circuitry having reduced weight, reduced size, lower manufacturing cost, and/or lower power requirements. Accordingly, embodiments of the present disclosure are directed to these and other improvements in phased array antenna systems or portions thereof.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, an apparatus includes a first plurality of digital beamformers associated with a first channel, the first plurality of digital beamformers configured to encode each data beam of a first plurality of data beams of the first channel with a respective time delay and phase to generate an encoded first plurality of data beams; a second plurality of digital beamformers associated with a second channel different from the first channel, the second plurality of digital beamformers configured to encode each data beam of a second plurality of data beams of the second channel with a respective time delay and phase to generate an encoded second plurality of data beams; a channel combiner, electrically coupled to the first and second plurality of digital beamformers, and configured to generate a combined channel comprising an aggregation of the encoded first plurality of data beams and the encoded second plurality of data beams, wherein the combined channel has a bandwidth that is a function of a bandwidth of one or both of the first or second channel; and a radio frequency (RF) transmission section, electrically coupled to the channel combiner, and configured to generate an output signal to be provided to a transmitting antenna based on the combined channel, wherein the RF transmission section includes a digital-to-analog converter (DAC) and a mixer.

In some embodiments, an apparatus includes a first plurality of digital beamformers associated with a first channel, the first plurality of digital beamformers configured to encode each data beam of a first plurality of data beams of the first channel with a respective time delay and phase to generate an encoded first plurality of data beams; a second plurality of digital beamformers associated with a second channel different from the first channel, the second plurality of digital beamformers configured to encode each data beam of a second plurality of data beams of the second channel with a respective time delay and phase to generate an encoded second plurality of data beams; and a plurality of channel combiners electrically coupled to the first and second plurality of digital beamformers, wherein each channel combiner of the plurality channel combiners is configured to generate a combined channel comprising an aggregation of the encoded first plurality of data beams and the encoded second plurality of data beams, wherein the combined channel has a bandwidth that is a function of a bandwidth of one or both of the first or second channel, wherein the combined channel is to be transmitted on an antenna of a phased array antenna.

In some embodiments, a phased array antenna system includes a plurality of antenna elements arranged in an antenna lattice; and an integrated circuit (IC) chip comprising: a first plurality of digital beamformers associated with a first channel, the first plurality of digital beamformers configured to encode each data beam of a first plurality of data beams of the first channel with a respective time delay and phase to generate an encoded first plurality of data beams; a second plurality of digital beamformers associated with a second channel different from the first channel, the second plurality of digital beamformers configured to encode each data beam of a second plurality of data beams of the second channel with a respective time delay and phase to generate an encoded second plurality of data beams; a channel combiner, electrically coupled to the first and second plurality of digital beamformers, and configured to generate a combined channel comprising an aggregation of the encoded first plurality of data beams and the encoded second plurality of data beams; and a radio frequency (RF) transmission section, electrically coupled to the channel combiner, and configured to generate an output signal to be provided to an antenna element of the plurality of antenna elements based on the combined channel, wherein the RF transmission section includes a digital-to-analog converter (DAC) and a mixer, and wherein power requirement of the system is reduced by 20-30% relative to a system that transmits the first and second plurality of data beams using an IC chip absent the channel combiner.

In some embodiments, a method includes, in response to receiving a first plurality of data beams of a first channel, generating an encoded digital first plurality of data beams by encoding each data beam of the first plurality of data beams with a respective time delay and phase; in response to receiving a second plurality of data beams of a second channel, generating an encoded digital second plurality of data beams by encoding each data beam of the second plurality of data beams with a respective time delay and phase; combining the encoded digital first plurality of data beams and the encoded digital second plurality of data beams to generate a combined channel having a bandwidth that is a function of a bandwidth of one or both of the first or second channel; applying digital-to-analog conversion to the combined channel signal to generate an analog combined channel signal; up converting the analog combined channel signal to generate a radio frequency (RF) signal based on the analog combined channel signal; and wirelessly transmitting the RF signal on an antenna included in a phased array antenna.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
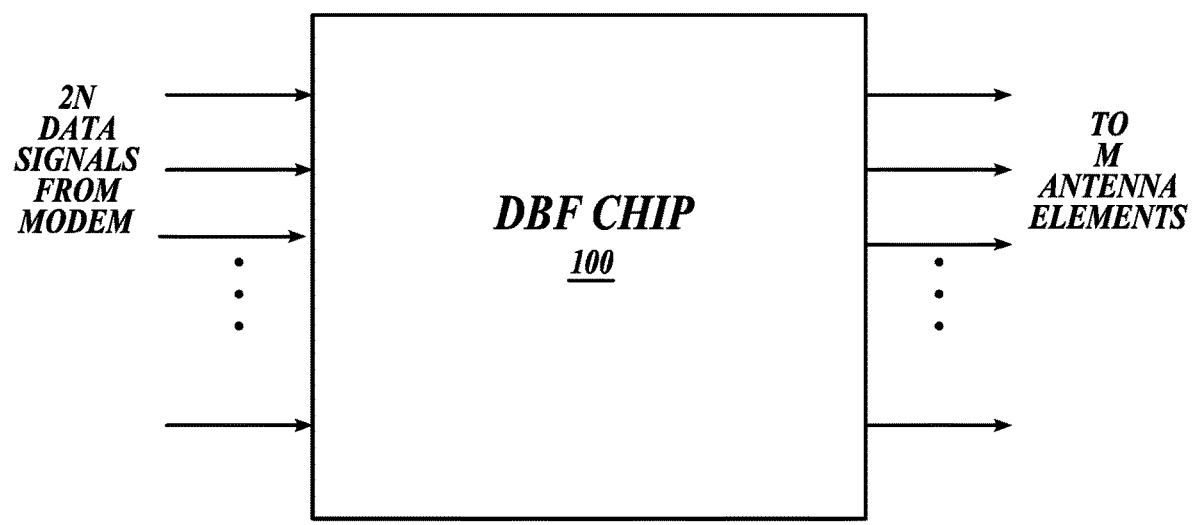
FIG. 1 is an example illustration of a digital beamformer (DBF) chip included in a phased array antenna system in accordance with some embodiments of the present disclosure.

Embodiments of apparatuses and methods relate to channel aggregation digital beamforming. In some embodiments, an apparatus includes a first plurality of digital beamformers associated with a first channel, the first plurality of digital beamformers configured to encode each data beam of a first plurality of data beams of the first channel with a respective time delay and phase to generate an encoded first plurality of data beams; a second plurality of digital beamformers associated with a second channel different from the first channel, the second plurality of digital beamformers configured to encode each data beam of a second plurality of data beams of the second channel with a respective time delay and phase to generate an encoded second plurality of data beams; a channel combiner, electrically coupled to the first and second plurality of digital beamformers, and configured to generate a combined channel comprising an aggregation of at least a portion of the encoded first plurality of data beams and at least a portion of the encoded second plurality of data beams, wherein the combined channel has a bandwidth that is a function of a bandwidth of one or both of the first or second channel; and a radio frequency (RF) transmission section, electrically coupled to the channel combiner, and configured to generate an output signal to be provided to a transmitting antenna based on the combined channel, wherein the RF transmission section includes a digital-to-analog converter (DAC) and a mixer. These and other aspects of the present disclosure will be more fully described below.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C).

Language such as "top surface", "bottom surface", "vertical", "horizontal", and "lateral" in the present disclosure is meant to provide orientation for the reader with reference to the drawings and is not intended to be the required orientation of the components or to impart orientation limitations into the claims.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, it may not be included or may be combined with other features.

Many embodiments of the technology described herein may take the form of computer- or controller-executable instructions, including routines executed by a programmable computer or controller. Those skilled in the relevant art will appreciate that the technology can be practiced on computer/controller systems other than those shown and described above. The technology can be embodied in a special-purpose computer, controller or data processor that is specifically programmed, configured or constructed to perform one or more of the computer-executable instructions described above. Accordingly, the terms "computer" and "controller" as generally used herein refer to any data processor and can include Internet appliances and hand-held devices (including palm-top computers, wearable computers, cellular or mobile phones, multi-processor systems, processor-based or programmable consumer electronics, network computers, mini computers and the like). Information handled by these computers can be presented at any suitable display medium, including an organic light emitting diode (OLED) display or liquid crystal display (LCD).

Figure 9:
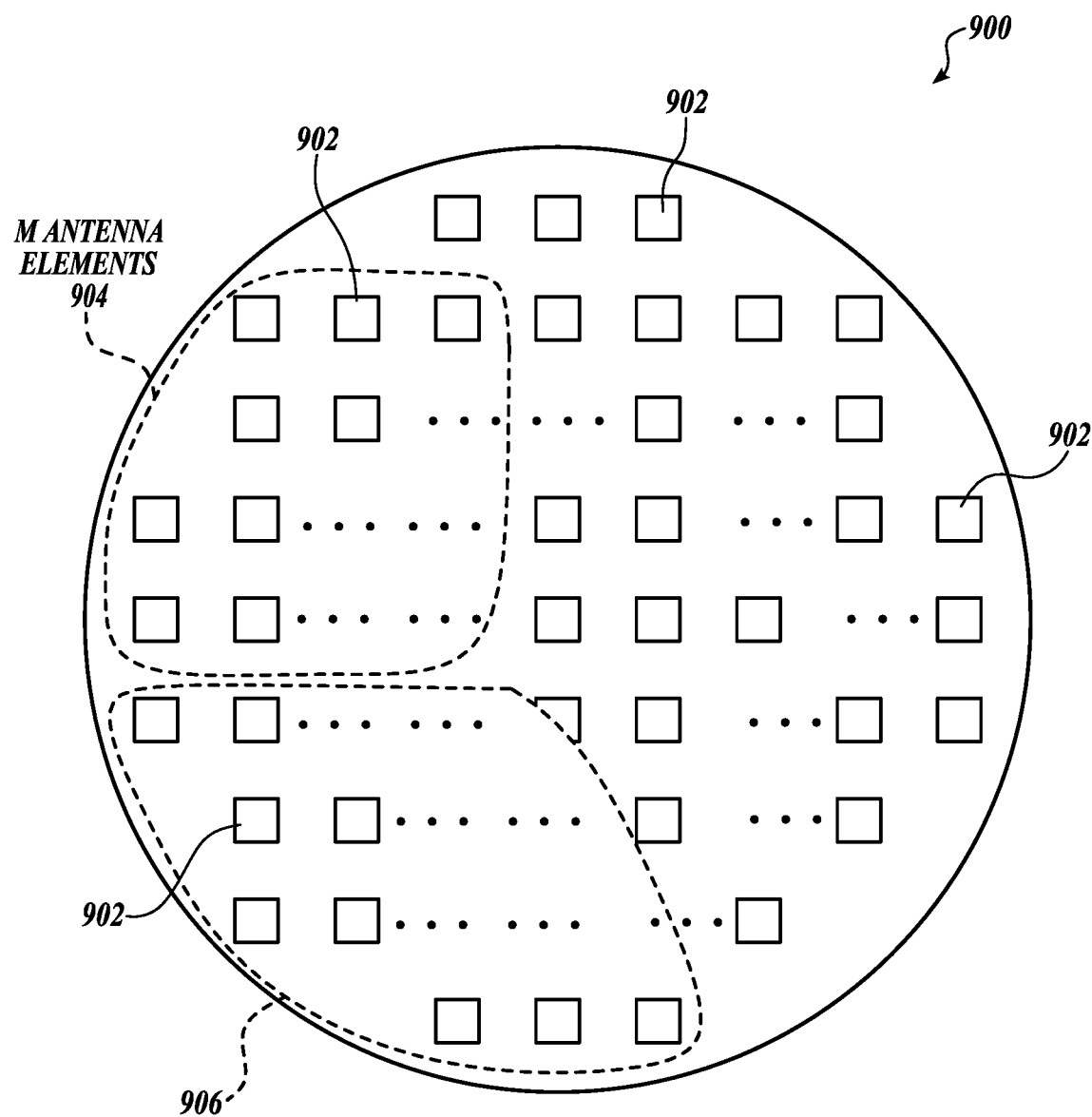
FIG. 9 is an example illustration of a top view of an antenna lattice in accordance with some embodiments of the present disclosure.

FIG. 1 is an example illustration of a digital beamformer (DBF) chip 100 included in a phased array antenna system in accordance with some embodiments of the present disclosure. DBF chip 100 comprises at least a portion of a transmitter or transmitter panel of the phased array antenna system. In an embodiment, DBF chip 100 comprises a single integrated circuit (IC) chip package including a plurality of pins, in which at least a first subset of the plurality of pins is configured to receive 2N number of data signals or streams included in a plurality of channels from a modem and a second subset of the plurality of pins is configured to output radio frequency (RF) signals to be transmitted by M number of antenna elements included in an antenna lattice of the phased array antenna system. FIG. 9 is an example illustration of a top view of an antenna lattice 900 in accordance with some embodiments of the present disclosure. Antenna lattice 900 (also referred to as a phased array antenna) includes a plurality of antenna elements 902 arranged in a particular pattern. A subset 904 of the plurality of antenna elements 902 comprises the M antenna elements.

Figure 2:
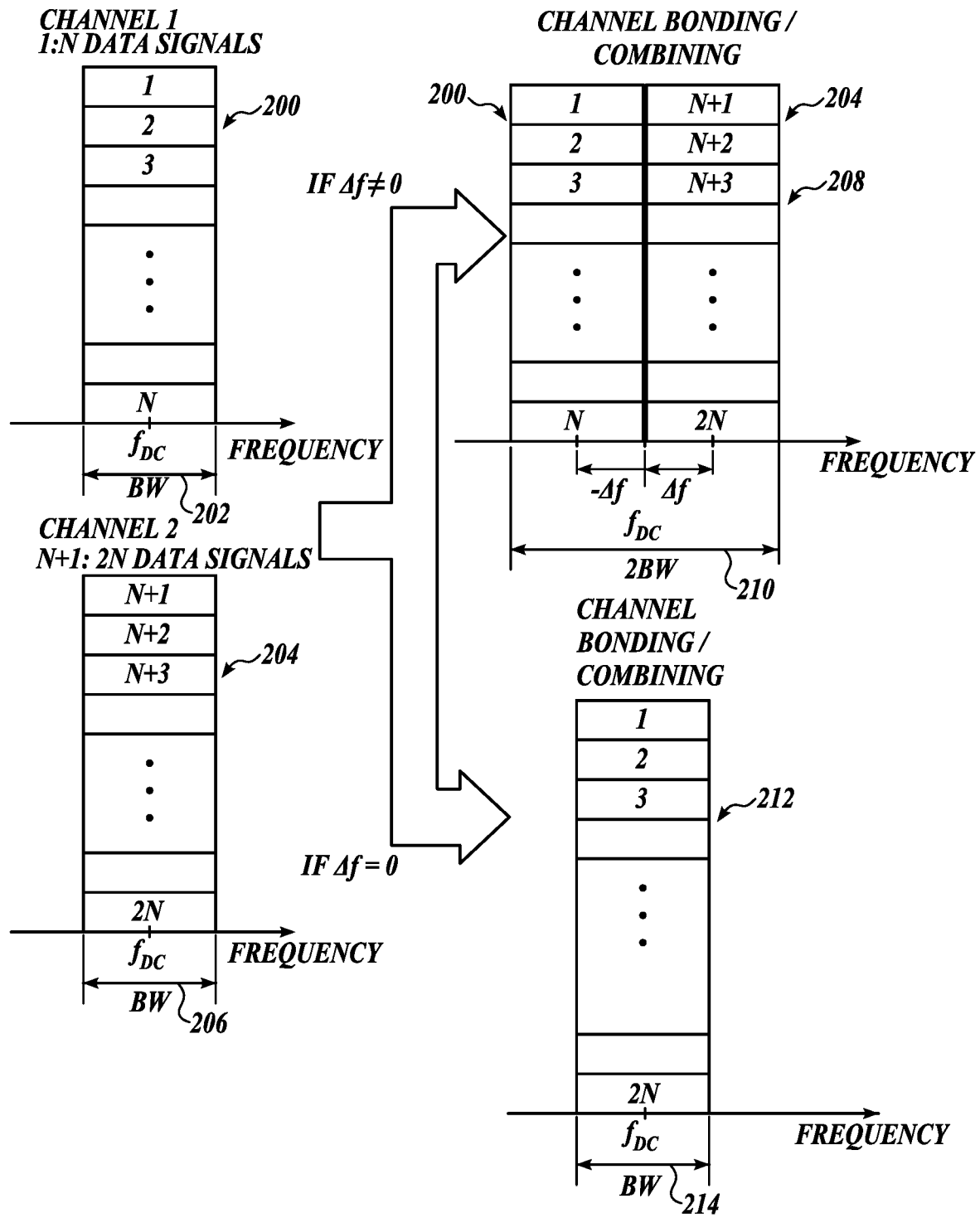
FIG. 2 is an example illustration of a plurality of data beams or signals included in a plurality of channels undergoing signal processing by the DBF chip in accordance with some embodiments of the present disclosure.
Figure 3:
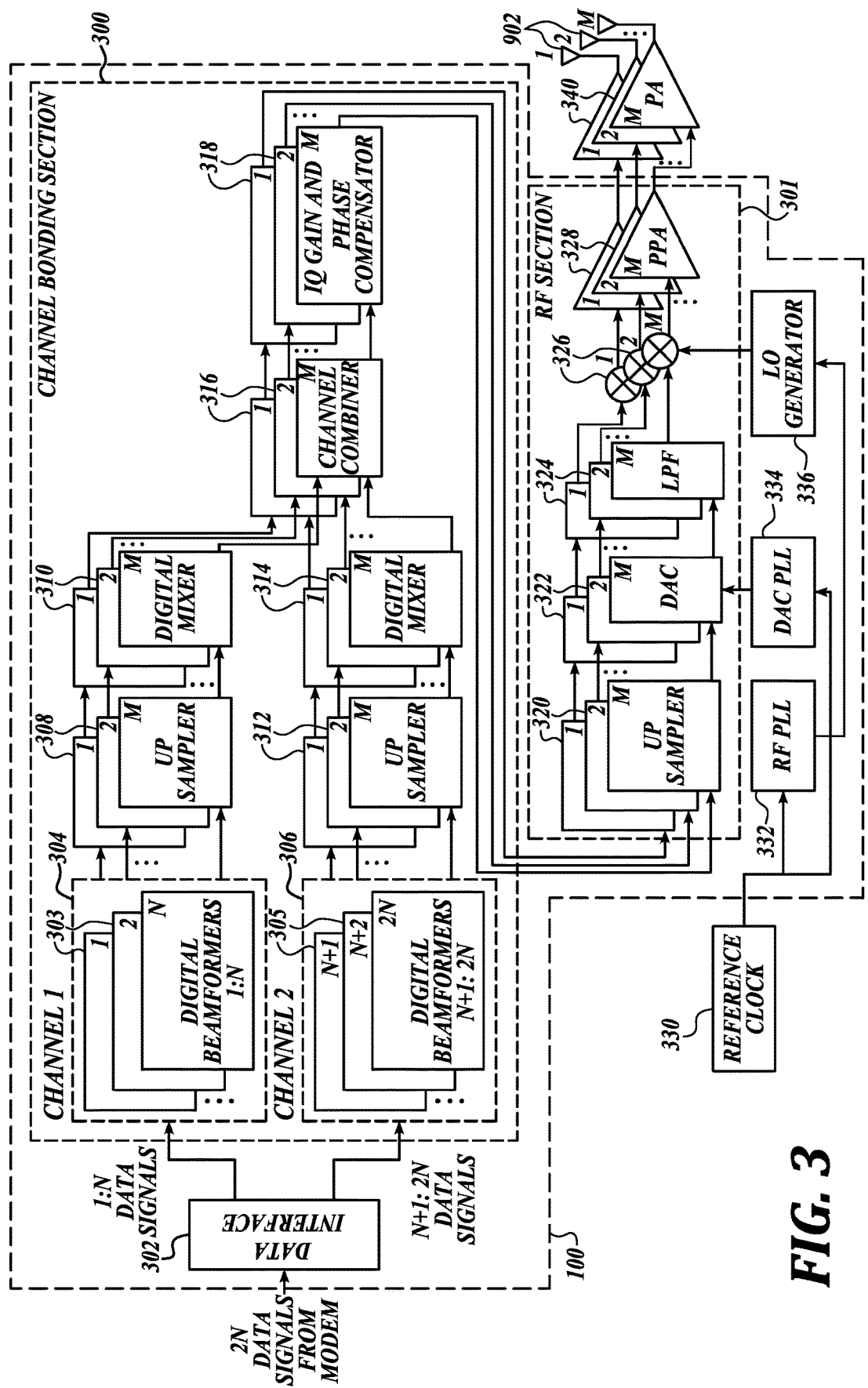
FIG. 3 is an example illustration showing circuitry or components included in the DBF chip in accordance with some embodiments of the present disclosure.

FIG. 2 is an example illustration of a plurality of data beams or signals included in a plurality of channels undergoing signal processing by DBF chip 100 in accordance with some embodiments of the present disclosure. FIG. 3 is an example illustration showing circuitry or components included in the DBF chip 100 in accordance with some embodiments of the present disclosure. FIG. 2 will be described in conjunction with FIG. 3.

In an embodiment, the 2N data beams inputted to the DBF chip 100 are initially carried on a plurality of channels, in which N is greater than 1. As shown in FIG. 2, a signal 200 is representative of a first channel 200 (also referred to as channel 1) carrying or comprising N data beams of the 2N data beams (denoted as 1 to N data signals, in which N is greater than 1) and having a bandwidth 202 of BW. A signal 204 is representative of a second channel 204 (also referred to as channel 2) carrying or comprising the remaining N data beams of the 2N data beams (denoted as N+1 to 2N data signals) and having a bandwidth 206 of BW. Bandwidths 202 and 206 are the same or approximately the same as each other. The plurality of data beams included in the channels (the 2N data beams) are also referred to as data signals, data streams, and/or the like.

In DBF chip 100, each data beam or signal of the 2N data beams is differently encoded relative to each other so that each of the data beams can be reconstructed in its entirety and distinctly from the other data beams at the receiver side even though the two channels comprising the 2N data beams are transmitted as a combined or aggregated channel, as will be described in detail below. Depending on the particular frequency shift applied to first and second channels 200, 204, the combined or aggregated channel after channel bonding can comprise a combined channel represented as a signal 208 having a bandwidth 210 that is twice the bandwidth (or approximately twice the bandwidth) of either the first or second channel 200, 204 (e.g., bandwidth 210 is 2BW) or a combined channel represented as a signal 212 having a bandwidth 214 that is the same bandwidth of either the first or second channel 200, 204 (e.g., bandwidth 214 is BW).

In an embodiment, DBF chip 100 includes a data interface 302, a channel bonding section 300, a RF section 301, a RF phase lock loop (PLL) 332, a digital-to-analog converter (DAC) PLL 334, and a local oscillator (LO) generator 336, as shown in FIG. 3. Channel bonding section 300 is electrically coupled in series between the data interface 302 and RF section 301. RF PLL 332, DAC PLL 334, and LO generator 336 variously electrical couple with each other or to RF section 301, as will be described in detail below. The channel bonding section 300 includes a plurality of digital beamformers (DBFs) 303, a plurality of DBFs 305, a plurality of up samplers 308, a plurality of digital mixers 310, a plurality of up samplers 312, a plurality of digital mixers 314, a plurality of channel combiners 316, and a plurality of IQ gain and phase compensators 318. The RF section 301 includes a plurality of up samplers 320, a plurality of DACs 322, a plurality of low pass filters (LPFs) 324, a plurality of mixers 326, and a plurality of pre power amplifiers (PPAs) 328. Channel bonding section 300 is also referred to as a baseband section, a baseband processing section, a digital baseband processing section, a digital time delay and phase encoding section, and/or the like. RF section 301 is also referred to as a RF processing section, a RF carrier application section, and/or the like.

The channel bonding section 300 is configured to uniquely encode each data signal or beam of the 2N data beams configured in more than one channel and then combines or bonds the encoded data beams into a single combined/aggregated channel. The unique encoding of the data beams permits the data beams to be superimposed or stacked on each other in the same frequency range for transmission on each antenna element of the subset 904 of the plurality of antenna elements 902 (e.g., the M antenna elements) and then reconstituted at a receiver. The RF section 301, also referred to as a RF transmitter or transmission section, along with RF PLL 332, DAC PLL 334, and LO generator 336 configures the combined/aggregated channel output of the channel bonding section 300 on a RF carrier signal suitable for transmission by each of M antenna elements 902.

The plurality of DBFs 303 comprise N number of DBFs, one for each of the N data beams of channel 1 provided by the data interface 302. Data beam 1 of channel 1 is the input to DBF 1 of DBFs 303, data beam 2 of channel 1 is the input to DBF 2 of DBFs 303, and so forth to data beam N of channel 1 being the input to DBF N of DBFs 303. Likewise, the plurality of DBFs 305 comprise N number of DBFs, one for each of the N+1 to 2N data beams of channel 2 provided by the data interface 302. Data beam N+1 of channel 2 is the input to DBF N+1 of DBFs 305, data beam N+2 of channel 2 is the input to DBF N+2 of DBFs 305, and so forth to data beam 2N of channel 2 being the input to DBF 2N of DBFs 305. Each DBF of the plurality of DBFs 303, 305 is configured to encode the respective data beam with a particular time delay and phase, as shown in detail in FIGS. 4 and 5.

Section 304 denoted in FIG. 3 includes the N number of DBFs 303 and M number of summation components or adders (see FIG. 4) to generate M outputs that are the respective inputs to the plurality of up samplers 308. Likewise, section 306 denoted in FIG. 3 includes the N number of DBFs 305 and M number of summation components or adders (see FIG. 4) to generate M outputs that are the respective inputs to the plurality of up samplers 312. Signals 200 and 204 of FIG. 2 are representative of the respective inputs to sections 304 and 306.

The plurality of up samplers 308 comprise M number of up samplers, one for each of the respective M signals provided by section 304. Signal 1 outputted by section 304 is the input to up sampler 1 of up samplers 308, signal 2 outputted by section 304 is the input up sampler 2 of up samplers 308, and so forth to signal M outputted by section 304 being the input to up sampler M of up samplers 308. Each of the up samplers 308 is configured to resample its respective input signal to a higher sample rate or density and provide an up sampled signal as the output.

The outputs of up samplers 308 are the inputs to respective digital mixers 310. The plurality of digital mixers 310 comprise M number of digital mixers, one for each of the respective M up sampled signals provided by up samplers 308. Up sampled signal 1 outputted by up sampler 1 is the input to digital mixer 1 of digital mixers 310, up sampled signal 2 outputted by up sampler 2 is the input to digital mixer 2 of digital mixers 310, and so forth. The digital mixers 310 are configured to frequency shift the center frequency associated with the up sampled signals. A particular amount of frequency shifting can be applied such as zero or greater than zero amount of frequency shifting. Plurality of up samplers 312 and plurality of digital mixers 314 are similar to respective up samplers 308 and digital mixers 310 except they process the M outputs of section 306 for channel 2. Digital mixers 310, 314 may also referred to as frequency shifters, digital frequency shifters, or the like.

In an embodiment, digital mixers 310 and 314 are configured to apply a symmetric amount of frequency shift to respective sets of up sampled signals. If the digital mixers 314 are set to frequency shift by $\Delta f$, then the digital mixers 310 are set to frequency shift by $-\Delta f$ (or vice versa). For example, as shown in FIG. 2, signal 200 associated with channel 1 and signal 204 associated with channel 2 both have the same baseband center frequency $f_{DC}$. If a non-zero amount of frequency shifting ($\Delta f \neq 0$) is applied by digital mixers 310, 314, then the center frequency of signal 200 shifts by $-\Delta f$ and the center frequency of signal 204 shifts by $\Delta f$. The value of $\Delta f$ is approximately equal or greater than half the bandwidth 202 or 206 (e.g., $\Delta f \geq BW/2$).

The outputs of digital mixers 310 and 314 are the inputs to channel combiners 316. The plurality of channel combiners 316 comprise M number of channel combiners, with each ith channel combiner of the M channel combiners receiving the corresponding output from each of the ith digital mixers 310 and 314. Channel combiners 316 are configured to combine, aggregate, or bond the encoded data beams of channels 1 and 2 into a single combined or aggregated channel. The type of channel bonding performed by channel combiners 316 is in coordination with the amount of frequency shifting applied by digital mixers 310, 314. The M outputs of the channel combiners 316 comprise a single combined or aggregated channel containing encoded data beams 1:2N. Channel combiners 316 may also be referred to as channel bonding components or the like.

Signal 208 in FIG. 2 conceptually illustrates a combined/aggregated channel generated based on the contents of signals 200 and 204 after application of a $\pm\Delta f$ frequency shift by digital mixers 310, 314. The resulting combined/aggregated channel has a bandwidth 210 that is equal to or approximately twice the bandwidth of bandwidth 202 or 206 (or bandwidth 210 equals or is approximately equal to the sum of bandwidths 202 and 206). The encoded 2N data beams are "stacked" together or provided within the frequency range of the single combined channel having a bandwidth 210. Each of the encoded data beams 1 to N is provided in a (same) first frequency range of the single combined channel, and each of the encoded data beams N+1 to 2N is provided in a (same) second frequency range of the signal combined channel.

If no frequency shifting is applied to the encoded 2N data beams by digital mixers 310, 314 ($\Delta f = 0$), then after channel bonding by channel combiners 316, the combined or aggregated channel containing encoded data beams 1:2N is as shown as signal 212 in FIG. 2. Conceptually, all of the encoded 2N data beams are "stacked" together or provided within the same frequency range of the single combined channel having a bandwidth 214. The bandwidth 214 of the combined channel is the same (or approximately the same) as the bandwidth of either of the initial channels 1 or 2.

The M outputs of the channel combiners 316 comprise the inputs to the plurality of IQ gain and phase compensators 318. The plurality of IQ gain and phase compensators 318 comprise M number of IQ gain and phase compensators, with each ith IQ gain and phase compensator of the M IQ gain and phase compensators receiving the output from the ith channel combiner 316. Each ith IQ gain and phase compensator 318 is configured to pre-compensate for any undesirable DC offset, complex gain, and/or phase mismatch in the ith RF path.

The M outputs of the IQ gain and phase compensators 318 comprise the inputs to the plurality of up samplers 320. The plurality of up samplers 320 comprise M number of up samplers, with each ith up sampler of the M up samplers receiving the output from the ith IQ gain and phase compensator 318. Each of the up samplers 320 is configured to resample its respective input signal to a higher sample rate or density and provide the up sampled signal as the input to a DAC 322. For example, up samplers 320 may up sample by a factor of four.

In some embodiments, up samplers 320 may comprise parts of respective transmit digital front ends (Tx DFEs). Such Tx DFEs may be disposed between the IQ gain and phase compensators 318 and DACs 322 instead of up samplers 320.

The ith DAC 322 receives the output of the ith up sampler 320. There is a total of M number of IQ-DACs 322. IQ-DACs 322 are configured to convert the digital input signals into analog signals. The ith LPF 324 receives the output of the ith DAC 322. There is a total of M number of IQ-LPFs 324.

The analog signals from the DACs 322 are low pass filtered or de-noised by the LPFs 324. The ith mixer 326 receives the output of the ith LPF 324. There is a total of M number of mixers 326. Mixers 326 are configured to perform frequency up conversion to convert the (baseband) center frequency associated with the combined channel to a carrier frequency (e.g., change from $f_{DC}$ to $f_{RF}$). The ith PPA 328 receives the output of the ith mixer 326. There is a total of M number of PPAs 328. PPAs 328 are configured to amplify the received signals and provide the output to respective PAs 340.

A reference clock 330, located external to DBF chip 100, provides a common reference signal to RF PLL 332 and DAC PLL 334. DAC PLL 334, in turn, drives the DACs 322. RF PLL 332, in turn, drives the LO generator 336. The LO generator 336 provides common signals to the M mixers 326 to perform synchronized frequency up conversion.

The outputs of the PPAs 328 are the inputs to the PAs 340. The plurality of PAs 340 comprises M number of PAs, each ith PA of the M PAs receiving the output from the ith PPA 328. PAs 340 are configured to power amplify the received signals and provide the amplified signals for transmission by the respective antenna element 902 of the M number of antenna elements 902. Each ith antenna element of the M antenna elements 902 receives the output of the ith PA 340. PAs 340 and the M antenna elements 902 are located external to the DBF chip 100.

In some embodiments, either the M PPAs 328 or M PAs 340 may be optional if a single stage of power amplification is capable of providing the required amount of amplification for transmission of the signals by the antenna elements 902.

RF section 301 can comprise a quadrature direct conversion transmitter (IQ) section, a quadrature direct conversion transmitter, or the like. For each ith set of up sampler 320, DAC 322, LPF 324, and mixer 326, two such sets in parallel may be implemented, in which the first set is configured to process the I portion of the ith I and Q complex signal and the second set is configured to process the Q portion of the ith I and Q complex signal. The ith I and Q complex signal is the signal outputted by the ith IQ gain and phase compensator 318 to the RF section 301.

Figure 6:
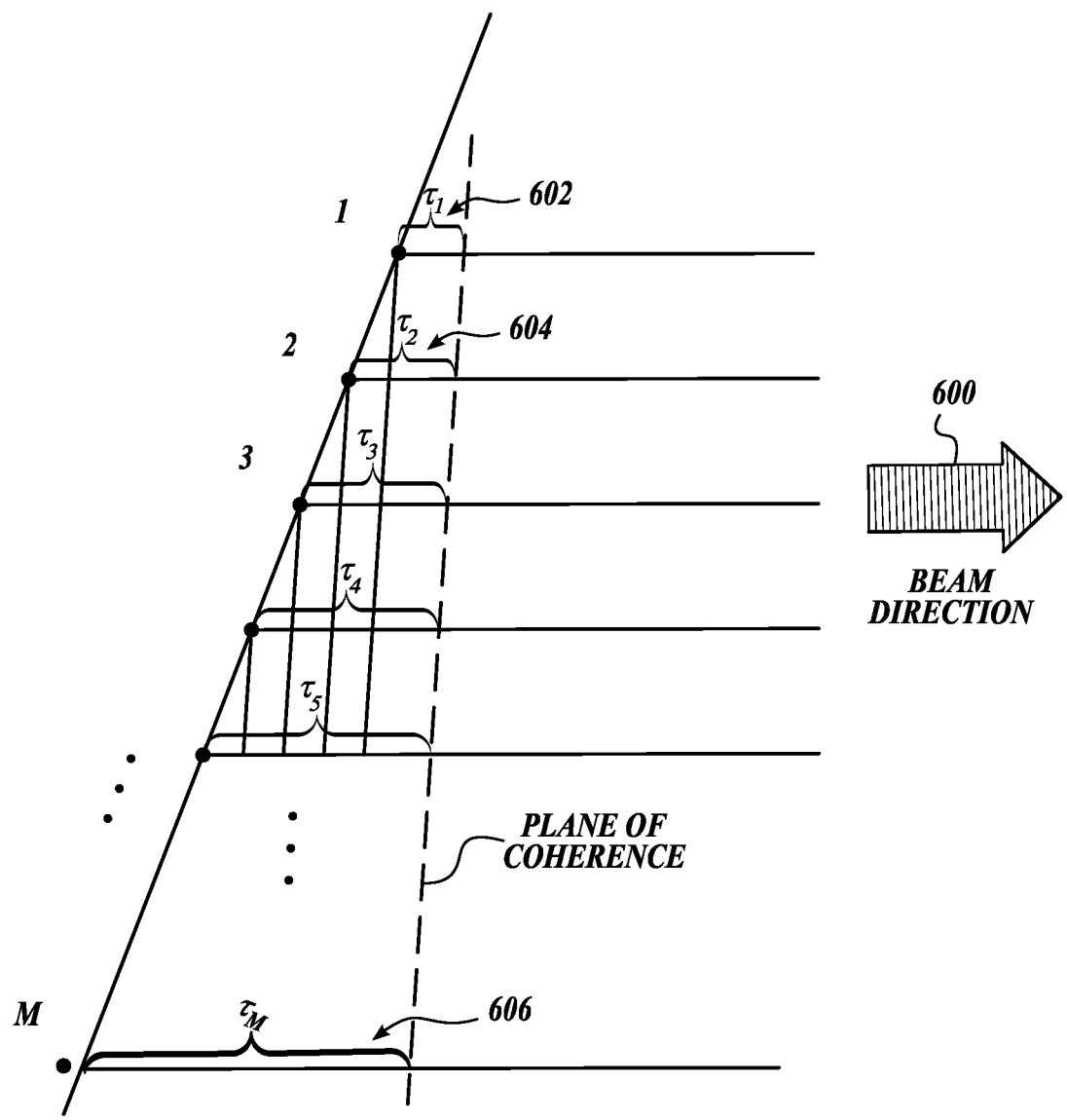
FIG. 6 is an example illustration showing time delay encoding included in the radiation or signals transmitted by the M antenna elements in accordance with some embodiments of the present disclosure.
Figure 7:
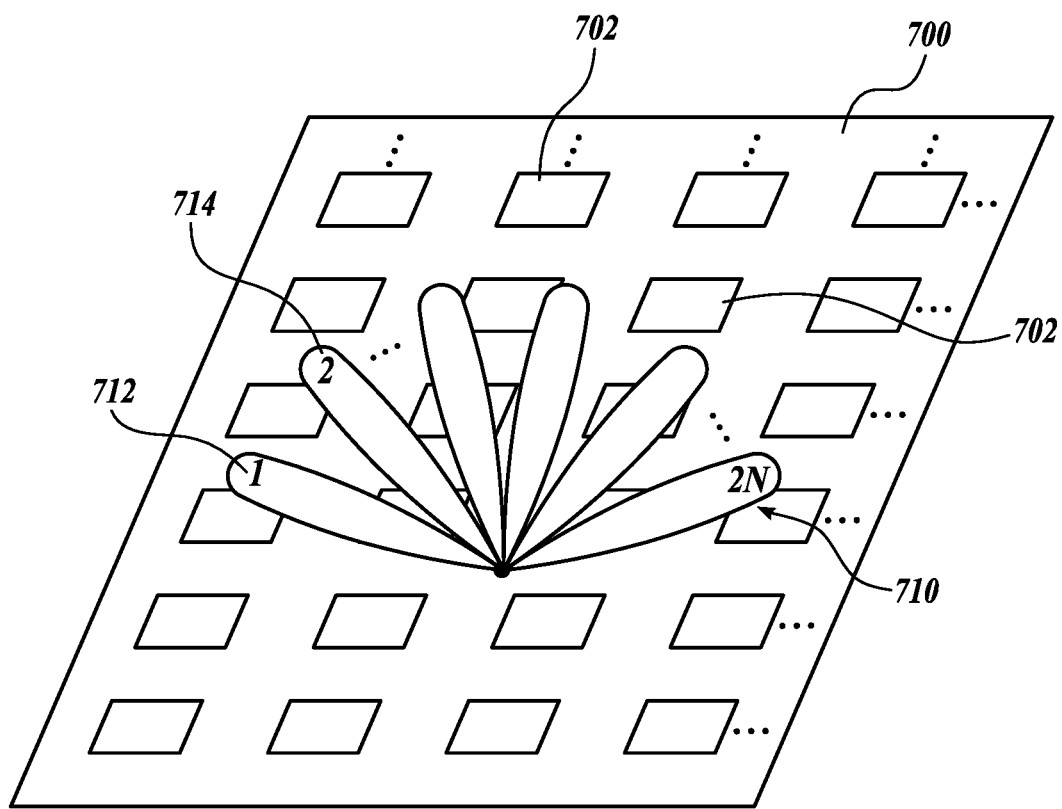
FIG. 7 is an example illustration showing an overall radiation or signal generated by the M antenna elements, such as the M antenna elements included in an antenna lattice, in accordance with some embodiments of the present disclosure.

FIG. 6 is an example illustration showing time delay encoding included in the radiation or signals transmitted by the M antenna elements in accordance with some embodiments of the present disclosure. The radiation is configured to propagate in a particular direction, namely, in a beam direction 600. Time delays 602, 604, 606 correspond to the time delays applied to the data beams of channels 1 and 2 by DBFs 303, 305. FIG. 7 is an example illustration showing an overall radiation or signal 710 generated by the M antenna elements, such as M antenna elements 702 included in an antenna lattice 700, in accordance with some embodiments of the present disclosure. Antenna lattice 700 may be similar to antenna lattice 900 and antenna elements 702 may be similar to antenna elements 902. Radiation 710 depicts only the main lobes of the overall antenna signal and omits showing the side lobes to simplify illustration. 2N main lobes are included in the radiation 710—a main lobe 712 for data beam 1, main lobe 714 for data beam 2, and so forth.

Because the 2N data beams of channels 1 and 2 are configured to be provided, by DBF chip 100, to M antenna elements for transmission suitable to be recovered or reconstituted by receiver(s), DBF chip 100 performs a transformation of the 2N signal paths at the input side associated with the 2N data beam inputs to M signal paths associated with the M antenna elements in order to output M signals to M antenna elements. Each of the M signal paths within DBF chip 100 comprises a distinct signal pathway, including a set of distinct components, to generate a particular output signal to a particular antenna element. The M signal paths may also be referred as transmit signal paths, signal processing paths, transmit signal processing pathway, and/or the like.

After summation of encoded 1:N data beams into M encoded signals in section 304 and summation of encoded N+1:2N data beams into M encoded signals in section 306, the ith encoded signal outputted by section 304, the ith encoded signal outputted by section 306, the ith up sampler 308, ith digital mixer 310, ith up sampler 312, ith digital mixer 314, ith channel combiner 316, ith IQ gain and phase compensator 318, ith up sampler 320, ith DAC 322, ith LPF 324, ith mixer 326, ith PPA 328, and ith PA 340 define the ith signal processing or traversal path for the ith antenna element. Hence, the signal path and associated processing components for antenna element 1 may be referred to as path 1, the signal path and associated processing components for antenna element 2 can be referred to as path 2, and so forth.

Figure 8:
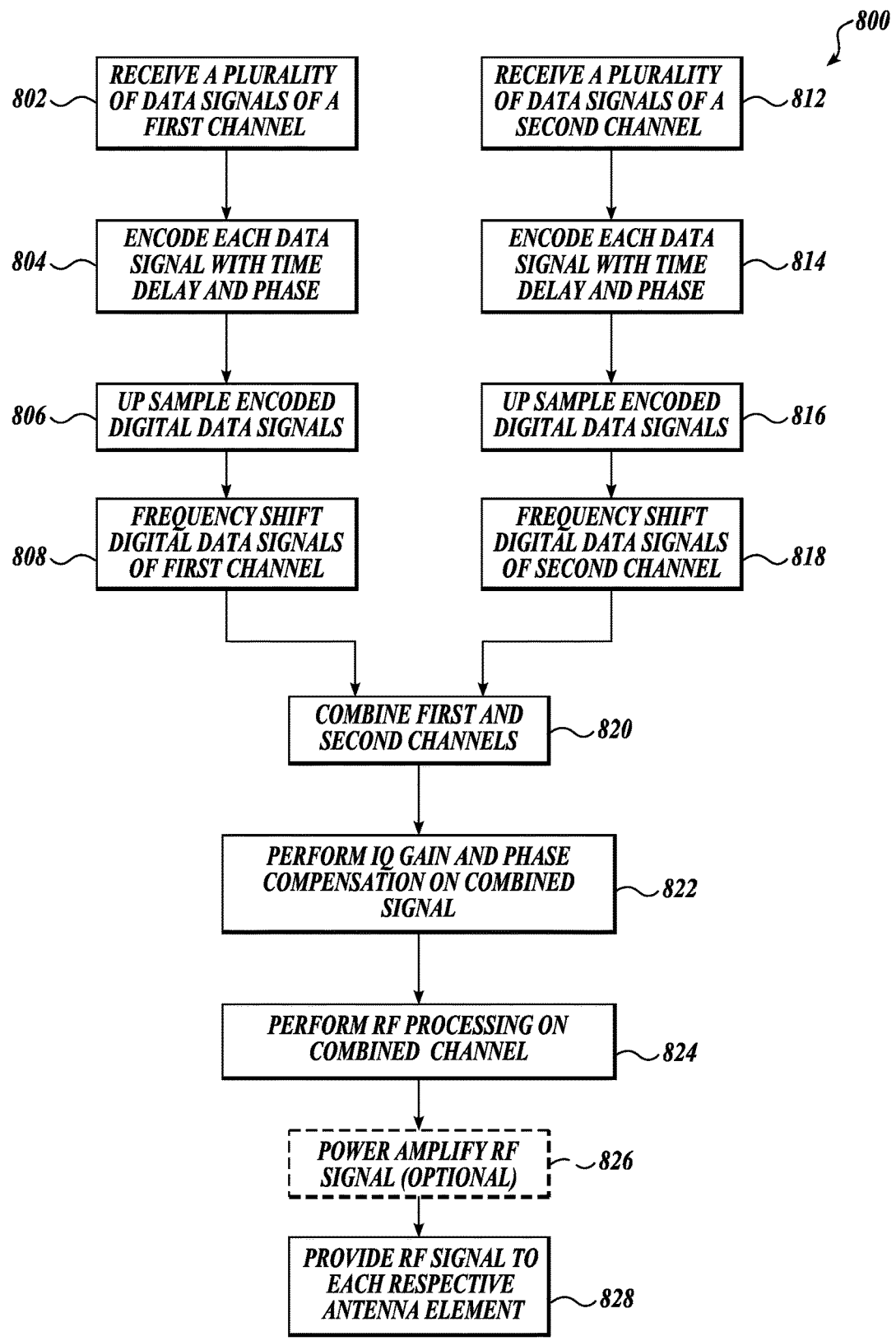
FIG. 8 is an example illustration of a process performed by the DBF chip in accordance with some embodiments of the present disclosure.

FIG. 8 is an example illustration of a process 800 performed by DBF chip 100 in accordance with some embodiments of the present disclosure. At a block 802, the data interface 302 included in DBF chip 100 receives a plurality of data beams of a first channel (e.g., 1:N data beams of channel 1) from a modem. The data interface 302 may perform preliminary processing, as needed, on the plurality of data beams of the first channel suitable for providing to section 304. Each of the data beams may also be referred to a data stream, data signal, or data.

Figure 4:
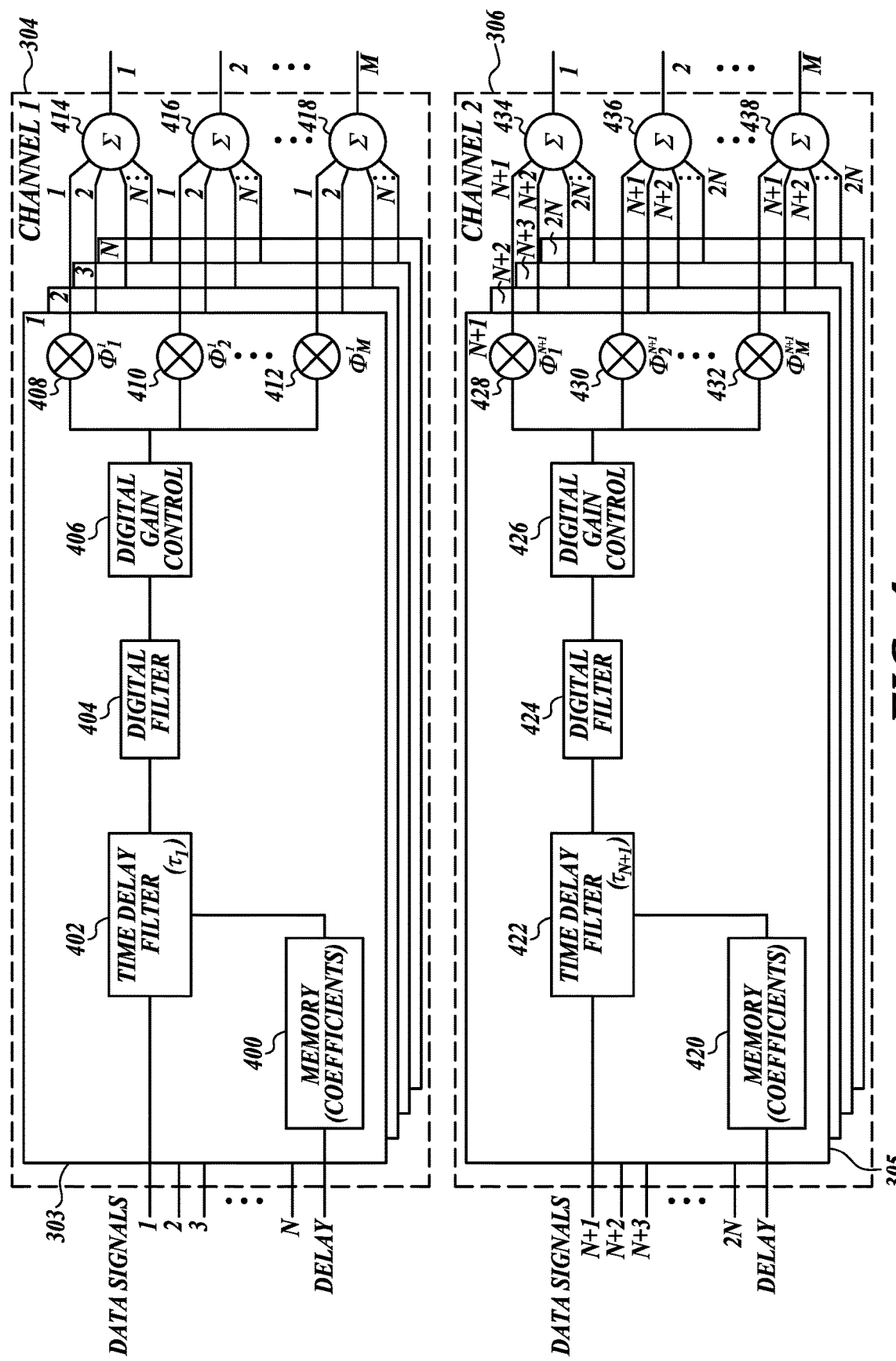
FIG. 4 is an example illustration showing additional details of a section of the DBF chip in accordance with some embodiments of the present disclosure.

Next at a block 804, section 304 is configured to encode each data beam of the plurality of data beams of the first channel with a particular time delay and phase. FIG. 4 is an example illustration showing additional details of section 304 in accordance with some embodiments of the present disclosure. DBF 303 configured to receive data beam 1 of the plurality of data beams of the first channel includes a memory 400, a time delay filter 402, a digital filter 404, a digital gain control 406, and a set of M number of phase filters $\phi^1_1$ to $\phi^1_M$. Time delay filter 402 receives data beam 1 from data interface 302. The output of time delay filter 402 is the input to the digital filter 404. The output of digital filter 404 is the input to the digital gain control 406. The output of the digital gain control 406 is the input to each of the M phase filters. Memory 400 receives a delay signal and provides a control signal to the time delay filter 402 based on the delay signal.

In an embodiment, time delay filter 402 comprises a finite impulse response filter (FIR), a transversal filter, a Farrow FIR, and/or the like. Memory 400 generates a control signal that specifies the amount of time delay to be applied by time delay filter 402. For example, a time delay $\tau_1$ is applied or encoded to data beam 1 by time delay filter 402. Data beam 1 encoded with time delay $\tau_1$ is provided to digital filter 404 to remove noise or other undesirable components. Digital filter 404 may be optional where filtering is not necessary due to quality of the signals from the modem.

Digital gain control 406 is configured to amplify data beam 1 with applied time delay $\tau_1$ for providing to the set of M number of phase filters. The set of M phase filters may also be referred to as a phase filter stage, and each phase filter may also be referred to as a phase shifter, phase multiplier, or the like. Each of the M phase filters is configured to encode data beam 1 with applied time delay $\tau_1$ with a particular phase that differs from the phase of the other phase filters. Phase filter 408 is configured to encode a phase $\phi^1_1$, phase filter 410 is configured to encode a phase $\phi^1_2$, and so forth up to phase filter 412 configured to encode a phase $\phi^1_M$. Each of the phases $\phi^1_1$ to phase $\phi^1_M$ is different from each other.

The DBF 303 for each of the remaining data beams 2 to N is similar to DBF 303 discussed above for data beam 1, except for the amount of time delay and phases applied to respective data beams 2 to N. For example, DBF 303 that receives data beam 2 applies a time delay $\tau_2$ to data beam 2, DBF 303 that receives data beam 3 applies a time delay $\tau_3$ to data beam 3, and the like. Likewise, the set of M phase filters included in the DBF 303 for data beam 2 applies phases $\phi^2_1$ to phase 64, the set of M phase filters included in the DBF 303 for data beam 3 applies phases $\phi^3_1$ to phase 64, and the like. The time delays encoded on the 1:N data beams differ from each other. The phases encoded to the 1:N data beams also differ from each other.

As shown in FIG. 4, section 304 also includes a summation stage comprising a plurality of adders or summation components configured to combine/aggregate particular outputs of DBFs 303 and generate M outputs of section 304. The summation stage comprises M adders. Adder 414 associated with path 1 combines the outputs of the phase shifters associated with path 1 from all of the N DBFs 303. Output of phase filter 408 that applies a phase shift $\phi^1_1$ in DBF 303 associated with data beam 1, output of the phase filter that applies a phase shift $\phi^2_1$ in DBF 303 associated with data beam 2, and so forth to the output of the phase filter that applies a phase shift $\phi^N_1$ in DBF 303 associated with data beam N are combined together by adder 414 and comprises the output signal of section 304 for path 1.

Adder 416 associated with path 2 combines the outputs of the phase shifters associated with path 2 from all of the N DBFs 303. Output of phase filter 410 that applies a phase shift $\phi^1_2$ in DBF 303 associated with data beam 1, output of the phase filter that applies a phase shift $\phi^2_2$ in DBF 303 associated with data beam 2, and so forth to the output of the phase filter that applies a phase shift $\phi^N_2$ in DBF 303 associated with data beam N are combined together by adder 416 and comprises the output signal of section 304 for path 2. Adder 418 associated with path M combines the outputs of the phase shifters associated with path M from all of the N DBFs 303. Output of phase filter 412 that applies a phase shift $\phi^1_M$ in DBF 303 associated with data beam 1, output of the phase filter that applies a phase shift $\phi^2_M$ in DBF 303 associated with data beam 2, and so forth to the output of the phase filter that applies a phase shift $\phi^N_M$ in DBF 303 associated with data beam N are combined together by adder 418 and comprises the output signal of section 304 for path M.

Each of the time delay filters and phase filters can be set and reset to particular time delays and phases, respectively.

Returning to block 806 of FIG. 8, the M outputs of section 304 are up sampled by respective up samplers 308. The M outputs of section 304 comprise digital data beams of the first channel. Next at block 808, the M digital mixers 310 are configured to frequency shift the digital data beams of the first channel that have been up sampled in block 806. The amount of frequency shifting can be zero or a non-zero amount as discussed above.

Blocks 812-818 are similar to respective blocks 802-808 except the signals processed are the plurality of data beams of a second channel different from the first channel (e.g., N+1:2N data beams of channel 2). Accordingly, section 306, up samplers 312, and digital mixers 314 of DBF chip 100 are used in blocks 812-818 instead of section 304, up samplers 308, and digital mixers 310, respectively.

Components included in section 306 are similar to components discussed above for section 304 except for the amount of time delay and phase encoding. As shown in FIG. 4, DBF 305 receives the N+1 data beam of channel 2 from data interface 302. DBF 305 for data beam N+1 includes a memory 420, a time delay filter 422, a digital filter 424, a digital gain control 426, and a set of M phase filters $\phi^{N+1}_1$ to $\phi^{N+1}_M$ which are similar to respective memory 400, time delay filter 402, digital filter 404, digital gain control 406, and set of M phase filters. However, time delay filter 422 is configured to apply a time delay $\tau_{N+1}$ instead of $\tau_1$ as in time delay filter 402. The set of phase filters included in DBF 305 for data beam N+1 is configured to apply or shift phases by $\phi^{N+1}_1$ to $\phi^{N+1}_M$, which are different phases than phases $\phi^1_1$ to $\phi^1_M$ of the set of phase filters included in DBF 303 for data beam 1. Different time delay and phases are encoded by each of the DBFs 305 to respective data beams N+1:2N. Not only do the time delays and phases applied differ between data beams of the same channel, the time delay and phases applied also differ between data beams of a plurality of channels.

Section 306 also includes a summation stage comprising a plurality of adders or summation components configured to combine/aggregate particular outputs of DBFs 305 and generate M outputs of section 306. The summation stage comprises M adders. Adder 434 associated with path 1 combines the outputs of the phase shifters associated with path 1 from all of the N DBFs 305. Output of phase filter 428 that applies a phase shift $\phi^{N+1}_1$ in DBF 305 associated with data beam N+1, output of the phase filter that applies a phase shift $\phi^{N+2}_1$ in DBF 305 associated with data beam N+2, and so forth to the output of the phase filter that applies a phase shift $\phi^{2N}_1$ in DBF 305 associated with data beam 2N are combined together by adder 434 and comprises the output signal of section 306 for path 1.

Adder 436 associated with path 2 combines the outputs of the phase shifters associated with path 2 from all of the N DBFs 305. Output of phase filter 430 that applies a phase shift $\phi^{N+1}_2$ in DBF 305 associated with data beam N+1, output of the phase filter that applies a phase shift $\phi^{N+2}_2$ in DBF 305 associated with data beam N+2, and so forth to the output of the phase filter that applies a phase shift $\phi^{2N}_2$ in DBF 305 associated with data beam 2N are combined together by adder 436 and comprises the output signal of section 306 for path 2. Adder 438 associated with path M combines the outputs of the phase shifters associated with path M from all of the N DBFs 305. Output of phase filter 432 that applies a phase shift $\phi^{N+1}_M$ in DBF 305 associated with data beam N+1, output of the phase filter that applies a phase shift $\phi^{N+2}_M$ in DBF 305 associated with data beam N+2, and so forth to the output of the phase filter that applies a phase shift $\phi^{2N}_M$ in DBF 305 associated with data beam 2N are combined together by adder 438 and comprises the output signal of section 306 for path M.

Figure 5:
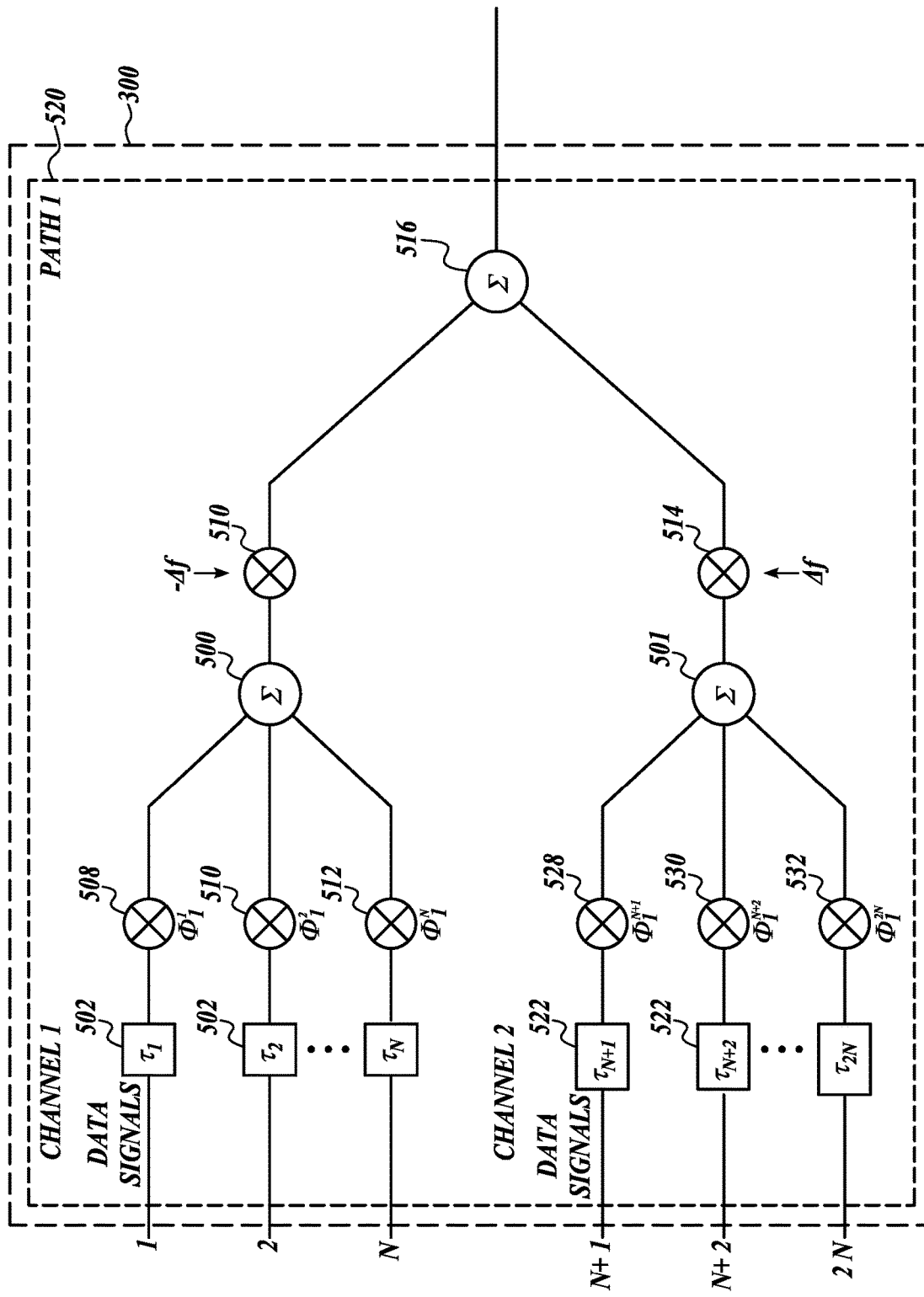
FIG. 5 is an example illustration showing generation of the combined channel signal for path 1 from a path-centric perspective in accordance with some embodiments of the present disclosure.

Returning to FIG. 8, at block 820, each of the ith channel combiners 316 (i=1 to M) is configured to combine the ith frequency shifted digital data beams of the first and second channels (from blocks 808 and 818) to form the ith combined or aggregated channel. FIG. 5 is an example illustration showing generation of the combined channel signal for path 1 from a path-centric perspective in accordance with some embodiments of the present disclosure. Section 520 includes the components included in the channel bonding section 300 that are associated with generation of the combined channel signal for path 1. Sections for each of paths 2 to M are similar to section 520 except for the particular time delays and phase shifts for respective paths.

The 1:N data beams of channel 1 are the inputs to respective time delay filters 502 ($\tau_1$:$\tau_N$). Each of the time delayed data beams is then phase shifted by a particular amount. For example, data beam 1 time delayed by $\tau_1$ is phase shifted by $\phi^1_1$ in phase filter 508. Data beam 2 time delayed by $\tau_2$ is phase shifted by $\phi^2_1$ in phase filter 510. Data beam N time delayed by $\tau_N$ is phase shifted by $\phi^N_1$ in phase filter 512. The time delayed and phase shifted data beams 1:N are combined by an adder 500. The signal combined by adder 500 is frequency shifted by an amount $-\Delta f$ by frequency shifter 510.

Thus, for path 1, the time delays for 1:N data beams run from $\tau_1$:$\tau_N$ and for N+1:2N data beams run from $\tau_{N+1}$:$\tau_{2N}$. It is contemplated that the 2N data beams may be split into two channels as K1 beams in a first channel and K2 beams in a second channel, in which K1+K2=2N and in which K1=K2 or K1≠K2.

The N+1:2N data beams of channel 2 are the inputs to respective time delay filters 522 ($\tau_{N+1}$:$\tau_{2M}$). Each of the time delayed data beams is then phase shifted by a particular amount. For example, data beam N+1 time delayed by $\tau_{N+1}$ is phase shifted by $\phi^{N+1}_1$ in phase filter 528. Data beam N+2 time delayed by $\tau_{N+2}$ is phase shifted by $\phi^{N+2}_1$ in phase filter 530. Data beam 2N time delayed by $\tau_{2N}$ is phase shifted by $\phi^{2N}_1$ in phase filter 532. The time delayed and phase shifted data beams N+1:2N are combined by an adder 501. The signal combined by adder 501 is frequency shifted by an amount $\Delta f$ by frequency shifter 514.

The frequency shifts signals outputted by frequency shifters 510 and 514 are combined by an adder 516. The output of adder 516 comprises the combined signal for path 1.

Time delay filter 502 for data beam 1, phase filter 508, phase filter 510, phase filter 512, time delay filter 522 for data beam 1, phase filter 528, phase filter 530, phase filter 532, adder 500, adder 501, frequency shifter 510, frequency shifter 514, and adder 516 are similar to respective time delay filter 402, phase filter 408, phase filter 410, phase filter 412, time delay filter 422, phase filter 428, phase filter 430, phase filter 432, adder 414, adder 434, digital mixer 310 associated with path 1, digital mixer 314 associated with path 1, and channel combiner 316 associated with path 1.

For the M combined channel signals from block 820, the ith IQ gain and phase compensator 318 is configured to perform gain and phase compensation to the ith combined channel signal, at a block 822. Next, each of the ith compensated combined signal is processed by the ith RF section 301 to generate a total of M RF signals (also referred to as antenna signals), at a block 824. The M RF signals can be power amplified by respective PAs 340, at a block 826. If the power level of the RF signals are sufficient based on power amplification applied by PPAs 328 included in the RF sections 301, then block 826 may be optional. Conversely, if PPAs 328 are omitted in RF sections 301, block 826 may be performed to provide RF signals at desired power levels. Lastly, the M RF signals are provided to respective antenna elements 902 for transmission, at a block 828.

As an example, DBF chip 100 supports M=32 antenna elements and the N number of data beams per channel is equal to or less than 64. As another example, M and N can be any of a variety of numbers. In some embodiments, the number of data beams in the first channel is the same or different from the number of data beams in the second channel. In some embodiments, more than two multi-beam channels may be combined and transmitted on M antenna elements.

The antenna lattice 900 of FIG. 9, or more particularly, subset 904 of antenna elements 902, is configured to transmit a combined beam composed of M RF signals in a preferred direction (such as in beam direction 600). An antenna aperture (also referred to as an aperture) is associated with antenna lattice 900. The antenna aperture is the area through which power is radiated by or to the antenna elements 902.

A phased array antenna synthesizes a specified electric field (phase and amplitude) across an aperture. Adding a phase shift to the signal transmitted by each antenna in an array of antennas allows the collective signal of these individual antennas to act as the signal of a single antenna.

In designing an antenna aperture for generating a single beam from a plurality of antenna elements, there are multiple considerations for efficiency in the system, including, but not limited to, total gain desired, beamwidth (e.g., how pointed the beam will be, a fan beam or a pencil beam, for example), and undesirable effects, such as side lobes.

Gain at broadside in a phased array is both a function of the individual element gain and the number of elements. The antenna aperture gain can be calculated by the following equation:

$$G_A = 4\pi(A\eta/\lambda^2)$$

where A=aperture area; $\eta$=aperture efficiency; and $\lambda$=wavelength.

The number of elements required in an electronically-scanning phased array antenna can be estimated by the gain it must provide. Generally, more antenna elements yields more gain in a phased array antenna. For example, a 30 decibel (dB) gain array may include about 1000 antenna elements and a 20 dB gain array may include about 100 antenna elements. Uniform spacing between antenna elements (e.g., spacing or distance 910) is typically more advantageous in terms of total gain than non-uniform spacing between antenna elements. However, gain is reduced when scanning at an angle proportional to the cosine of the angle. Therefore, when scanning at 60 degrees, the gain is reduced to ½.

The total area of the antenna aperture affects beamwidth. Therefore, the larger the area of the antenna aperture, the narrower the beam produced from the antenna aperture.

In an antenna aperture having an antenna lattice with a plurality of antenna elements, gaps between adjacent antenna elements can produce unwanted side lobes. Therefore, a threshold maximum spacing can be calculated between antenna elements to reduce unwanted side lobes. The individual antenna elements are spaced in the antenna aperture below the threshold maximum spacing to reduce side lobe leakage.

In addition to unwanted side lobes, grating lobes can occur when steering too far with a phased array. The effect of grating lobes is also referred to as "aliasing," resulting in the main beam reappearing on the wrong side. Therefore, antenna elements must also be spaced properly in order to avoid grating lobes. For uniformly spaced arrays with a constant spacing between elements, the maximum spacing can be half-wavelength to avoid grating lobes.

The equation for maximum spacing is a function of wavelength of operation and maximum scan angle:

$$d_{max} = \lambda/(1+\sin\theta)$$

where $\lambda$=wavelength and $\theta$=scan angle.

Thus for a 30 degree scan angle, $d_{max}$ is (⅔)$\lambda$, while for a 60 degree scan angle, $d_{max}$ is 0.54$\lambda$.

Therefore, the desired antenna aperture requires a balancing of multiple trade-offs in the system. For example, the system has a power budget for a total number of antenna elements. Knowing the total number of antenna elements based on the power budget, the area of the antenna aperture should be maximized for optimal beamwidth, but the spacing between antenna elements should be minimized to reduce side lobes, grating lobes, and aliasing.

The phased array antenna system including DBF chip 100 includes in total, a plurality of DBF chips similar to DBF chip 100. Each DBF chip of the plurality of DBF chips is configured to provide RF signals to be transmitted by a particular subset of the plurality of antenna elements 902 included in the antenna lattice 900. Such RF signals radiated by a particular subset of the antenna elements comprises a beam (also referred to as a transmitted beam, transmit beam, Tx beam, and/or the like) having a particular beam direction. The particular beam direction facilitates the beam impinging on, covering, or being received by a particular area or device. For example, DBF chip 100 is associated with subset 904, another DBF chip is associated with a subset 906 of the plurality of antenna elements 902 different from subset 904, and the like. The phased array antenna system can include a minimum number of DBF chips that is the total number of antenna elements divided by M.

In some embodiments, the phased array antenna system including DBF chip 100 and the rest of the plurality of DBF chips are included in a wireless communications system, a wideband communications system, a satellite-based communications system, a terrestrial- or ground-based communications system, a non-geostationary (NGO) satellite communications system, a low Earth orbit (LEO) satellite communications system, and/or the like. For example, without limitation, the phased array antenna system can be included in a satellite, a user terminal associated with user device(s), a gateway, a repeater, a communication node, and/or other device capable of receiving and transmitting signals with another device of a satellite communications system.

Figure 10:
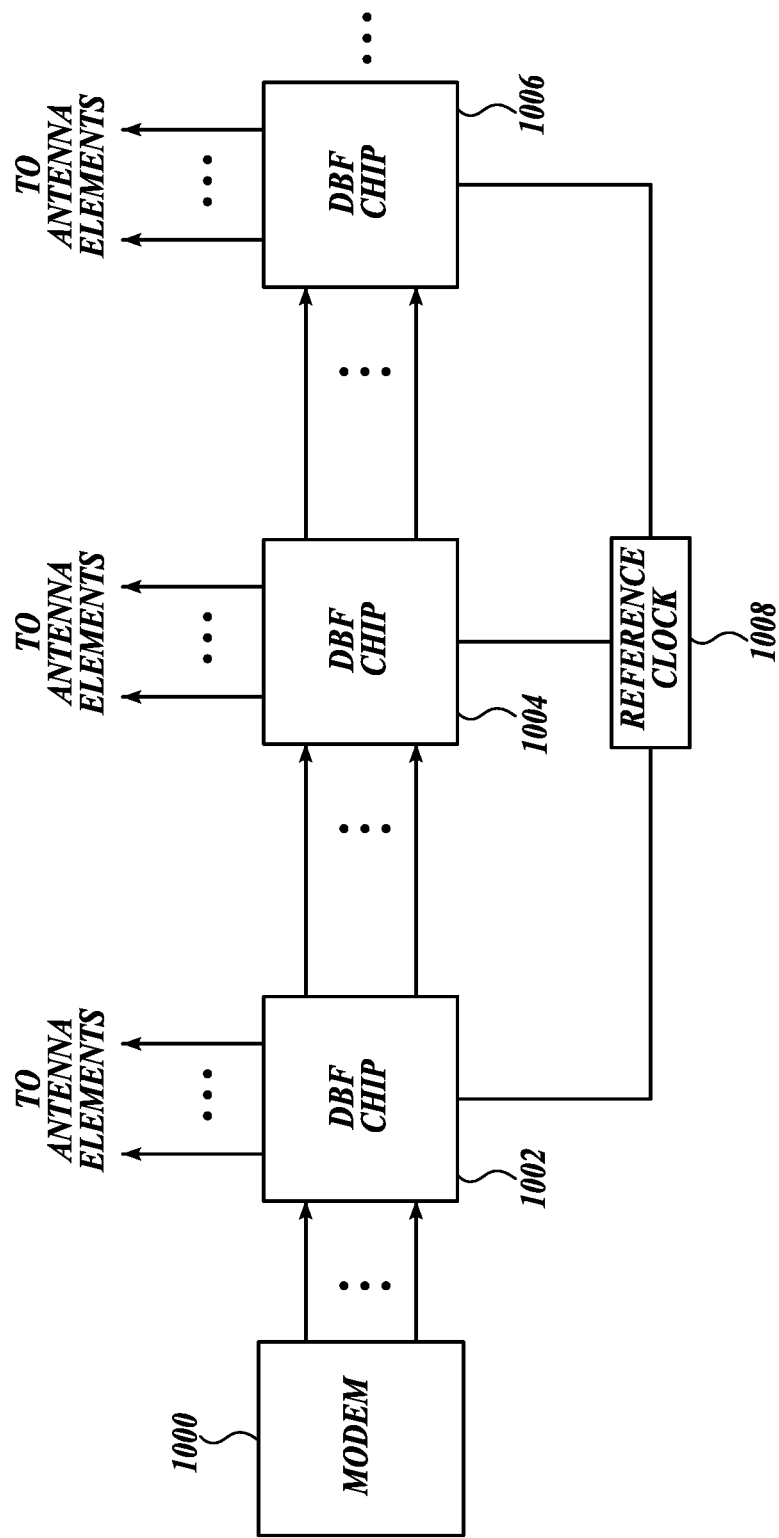
FIG. 10 is an example illustration of DBF chips implemented in a daisy chain configuration in accordance with some embodiments of the present disclosure.

FIG. 10 is an example illustration of DBF chips implemented in a daisy chain configuration in accordance with some embodiments of the present disclosure. A common modem 1000 can provide multi-channel, multi-beams per channel signals to a DBF chip 1002. DBF chip 1002, in response, configures at least a portion of the received signals into RF signals to be transmitted by its associated set of antenna elements, as discussed above. At least a portion of the signals from modem 1000 is provided to DBF chip 1004 via DBF chip 1002. In response, DBF chip 1004 similarly configures RF signals to be transmitted by its associated set of antenna elements. At least a portion of the signals from modem 1000 is provided to DBF chip 1006 via DBF chips 1002 and 1004. DBF chip 1006 similarly configures RF signals to be transmitted by its associated set of antenna elements. DBF chips 1002, 1004, and 1006 are synchronized by a common reference clock 1008. Reference clock 1008 may be similar reference clock 330 and serve to drive the RF PLLs, DAC PLLs, and LO generators of DBF chips 1002, 1004, 1006.

In this manner, two channels, each carrying a plurality of data beams, can be combined, aggregated, or bonded into a single combined channel for transmission by a set of M antenna elements included in an antenna lattice of a phased array antenna. Each antenna element of the set of antenna elements transmits a portion of the single combined channel information, so that the set of antenna elements as a whole transmits the entire content of the single combined channel in a format capable of being reassembled or reconstituted by a receiver. A single DBF chip performs the signal processing, including generation of the single digital combined channel and providing the single combined channel on a RF carrier signal for transmission, for the set of antenna elements.

Because the two channels are combined into the single combined channel, the number of components required to generate the RF signals for the set of antenna elements based on the single combined channel is half the number of components that would be required absent aggregation of the two channels. In other words, the number of RF sections 301 is reduced by half since two separate channels need not be RF processed. By extension, with fewer number of RF sections 301, fewer number of antenna elements are also needed to transmit the content of the two channels. With a fewer number of components used, reduction in power requirement, weight, space, and/or the like is achieved by the DBF chip. As an example, power requirement of the phased array antenna system is reduced by 20-30% relative to if the multi-beam two channels are transmitted without aggregation in a single digital channel in the DBF chips included in the phased array antenna system.

In some embodiments, DBF chip 100 is configured to receive as input a plurality of data beams included in more than two channels and generate a single aggregated or combined channel of such input for transmission. An N number of data beams (with N>1) included in each of a P number of channels (with P≥2), for a total of N×P number of data beams, can comprise the input to the data interface 302. For example, channel 1 includes 1:N data beams, channel 2 includes N+1:2N data beams, channel 3 includes 2N+1:3N data beams, and so forth. For each ith channel of the P number of channels, a N number of digital beamformers (similar to N digital beamformers 303), a M number of up samplers (similar to M up samplers 308), and a M number of digital mixers (similar to M digital mixers 310) are included in the channel bonding section 300 between the data interface 302 and the M channel combiners.

In some embodiments, one or more of particular digital beamformers (e.g., any of digital beamformers 303 or 305) in any of the plurality of digital beamformers 304, 306 can be effectively made inactive or disabled by dynamic control of the gain associated with such one or more of the particular digital beamformers. A processor or controller is configured to determine when and which of the particular digital beamformers are to be effectively inactive or disabled. In response to the determination, the gain factor or value associated with each of those particular digital beamformers of interest is set to zero (changed from a value greater than zero to zero). Accordingly, all of the M transmit signal (processing) paths of DBF chip 100 continue to generate and radiate signals, but the signal components outputted from the zero-gain digital beamformers will have zero amplitude and contribute a null or no data carrying component in the overall transmission beam. The remaining components of the overall transmission beam (those from the non-zero gain digital beamformers) and the overall transmission beam are not adversely impacted by the beam components associated with the zero gain.

Dynamic selective gain setting of particular digital beamformers of DBF chip 100 can occur in accordance with inactive or null data beams in the 2N data beams. For example, if data beams 1, 2, and 2N are inactive, null, absent data, or otherwise not to contribute to the overall beam to be transmitted, then respective digital beamformers 1, 2, and 2N can be set to zero gain. This means any resulting/overall transmission can have the same or fewer number of data-bearing signal components than the nominal or total number of possible signal components, even though all of the nominal/total number of possible signal components continue to be radiated or transmitted.

Examples of the devices, systems, and/or methods of various embodiments are provided below. An embodiment of the devices, systems, and/or methods can include any one or more, and any combination of, the examples described below.

Example 1 is an apparatus including a first plurality of digital beamformers associated with a first channel, the first plurality of digital beamformers configured to encode each data beam of a first plurality of data beams of the first channel with a respective time delay and phase to generate an encoded first plurality of data beams; a second plurality of digital beamformers associated with a second channel different from the first channel, the second plurality of digital beamformers configured to encode each data beam of a second plurality of data beams of the second channel with a respective time delay and phase to generate an encoded second plurality of data beams; a channel combiner, electrically coupled to the first and second plurality of digital beamformers, and configured to generate a combined channel comprising an aggregation of at least a portion of the encoded first plurality of data beams and at least a portion of the encoded second plurality of data beams, wherein the combined channel has a bandwidth that is a function of a bandwidth of one or both of the first or second channel; and a radio frequency (RF) transmission section, electrically coupled to the channel combiner, and configured to generate an output signal to be provided to a transmitting antenna based on the combined channel, wherein the RF transmission section includes a digital-to-analog converter (DAC) and a mixer.

Example 2 includes the subject matter of Example 1, and further includes first and second digital mixers electrically coupled between the channel combiner and respective first and second plurality of digital beamformers, and wherein the first digital mixer is configured to shift a first central frequency associated with the first channel and the second digital mixer is configured to shift a second central frequency associated with the second channel.

Example 3 includes the subject matter of any of Examples 1-2, and further includes wherein the plurality of first and second plurality of data beams comprise 2N data beams and each of the first and second plurality of digital beamformers comprises N digital beamformers, and further includes a plurality of channel combiners electrically coupled to the first and second plurality of digital beamformers, wherein the plurality of channel combiners comprises M channel combiners and the channel combiner is included in the plurality of channel combiners; and a plurality of RF transmission sections electrically coupled to the plurality of channel combiners, wherein the plurality of RF transmission sections comprises M RF transmission sections and the RF transmission section is included in the plurality of RF transmission sections, wherein the plurality of RF transmission sections is configured to generate M output signals, and wherein the plurality of RF transmission sections electrically couple to M antennas of a phased array antenna to provide the M output signals for transmission.

Example 4 includes the subject matter of any of Examples 1-3, and further includes wherein at least one particular digital beamformer of the first plurality of digital beamformers or at least one particular digital beamformer of the second plurality of digital beamformers is dynamically disabled with a zero gain setting if the data beam associated with the at least one particular digital beamformer comprises inactive data, null data, is missing data, or data not to be transmitted.

Example 5 includes the subject matter of any of Examples 1-4, and further includes wherein the bandwidth of the combined channel is the same as the bandwidth of the first channel or the bandwidth of the combined channel is the bandwidth of both the first and second channels.

Example 6 includes the subject matter of any of Examples 1-5, and further includes an antenna element electrically coupled to the RF transmission section and configured to transmit the output signal.

Example 7 includes the subject matter of any of Examples 1-6, and further includes wherein the antenna element is an antenna element of a plurality of antenna elements comprising a phased array antenna.

Example 8 is an apparatus including a first plurality of digital beamformers associated with a first channel, the first plurality of digital beamformers configured to encode each data beam of a first plurality of data beams of the first channel with a respective time delay and phase to generate an encoded first plurality of data beams; a second plurality of digital beamformers associated with a second channel different from the first channel, the second plurality of digital beamformers configured to encode each data beam of a second plurality of data beams of the second channel with a respective time delay and phase to generate an encoded second plurality of data beams; and a plurality of channel combiners electrically coupled to the first and second plurality of digital beamformers, wherein each channel combiner of the plurality channel combiners is configured to generate a combined channel comprising an aggregation of at least a portion of the encoded first plurality of data beams and at least a portion of the encoded second plurality of data beams, wherein each combined channel has a bandwidth that is a function of a bandwidth of one or both of the first or second channel, and wherein each combined channel is to be transmitted on an antenna of a phased array antenna.

Example 9 includes the subject matter of Example 8, and further includes first and second plurality of digital mixers, wherein the first plurality of digital mixers are electrically coupled between the first plurality of digital beamformers and the plurality of channel combiners and the second plurality of digital mixers are electrically coupled between the second plurality of digital beamformers and the plurality of channel combiners, and wherein each digital mixer of the first plurality of digital mixers is configured to shift a first central frequency associated with the first channel and each digital mixer of the second plurality of digital mixers is configured to shift a second central frequency associated with the second channel.

Example 10 includes the subject matter of any of Examples 8-9, and further includes wherein the first and second plurality of data beams comprise 2N data beams, each of the first and second plurality of digital beamformers comprises N digital beamformers, and the plurality of channel combiners comprises M channel combiners, and further comprising a plurality of RF transmission sections electrically coupled to the plurality of channel combiners, wherein the plurality of RF transmission sections comprises M RF transmission sections, and wherein the plurality of RF transmission sections electrically couple to M antennas of the phased array antenna.

Example 11 includes the subject matter of any of Examples 8-10, and further includes wherein the bandwidth of the combined channel is the same as the bandwidth of the first channel or the bandwidth of the combined channel is the bandwidth of both the first and second channels.

Example 12 includes the subject matter of any of Examples 8-11, and further includes wherein the apparatus comprises an integrated circuit (IC) chip.

Example 13 includes the subject matter of any of Examples 8-12, and further includes wherein at least one particular digital beamformer of the first plurality of digital beamformers or at least one particular digital beamformer of the second plurality of digital beamformers is dynamically disabled with a zero gain setting if the data beam associated with the at least one particular digital beamformer comprises inactive data, null data, is missing data, or data not to be transmitted.

Example 14 includes the subject matter of any of Examples 8-13, and further includes wherein each data beam of the at least a portion of the encoded first plurality of data beams and the at least a portion of the encoded second plurality of data beams is located in a same frequency range of the combined channel.

Example 15 includes the subject matter of any of Examples 8-14, and further includes wherein each data beam of the at least a portion of the encoded first plurality of data beams is located in a first frequency range of the combined channel and each data beam of the at least a portion of the encoded second plurality of data beams is located in a second frequency range of the combined channel.

Example 16 is a communication node of a communications system, the communication node including a plurality of antenna elements arranged in an antenna lattice; and an integrated circuit (IC) chip including a first plurality of digital beamformers associated with a first channel, the first plurality of digital beamformers configured to encode each data beam of a first plurality of data beams of the first channel with a respective time delay and phase to generate an encoded first plurality of data beams; a second plurality of digital beamformers associated with a second channel different from the first channel, the second plurality of digital beamformers configured to encode each data beam of a second plurality of data beams of the second channel with a respective time delay and phase to generate an encoded second plurality of data beams; a channel combiner, electrically coupled to the first and second plurality of digital beamformers, and configured to generate a combined channel comprising an aggregation of at least a portion of the encoded first plurality of data beams and at least a portion of the encoded second plurality of data beams; and a radio frequency (RF) transmission section, electrically coupled to the channel combiner, and configured to generate an output signal to be provided to an antenna element of the plurality of antenna elements based on the combined channel, wherein the RF transmission section includes a digital-to-analog converter (DAC) and a mixer, and wherein power requirement of the system is reduced by 20-30% relative to a system that transmits the first and second plurality of data beams in more than one channel.

Example 17 includes the subject matter of Example 16, and further includes first and second digital mixers electrically coupled between the channel combiner and respective first and second plurality of digital beamformers, and wherein the first digital mixer is configured to shift a first central frequency associated with the first channel and the second digital mixer is configured to shift a second central frequency associated with the second channel.

Example 18 includes the subject matter of any of Examples 16-17, and further includes wherein the first digital mixer is configured to shift the first central frequency by $\Delta f$ and the second digital mixer is configured to shift the second central frequency by $-\Delta f$.

Example 19 includes the subject matter of any of Examples 16-18, and further includes wherein the first and second plurality of data beams comprise 2N data beams and each of the first and second plurality of digital beamformers comprises N digital beamformers, and further including a plurality of channel combiners electrically coupled to the first and second plurality of digital beamformers, wherein the plurality of channel combiners comprises M channel combiners and the channel combiner is included in the plurality of channel combiners; and a plurality of RF transmission sections electrically coupled to the plurality of channel combiners, wherein the plurality of RF transmission sections comprises M RF transmission sections and the RF transmission section is included in the plurality of RF transmission sections, and wherein the plurality of RF transmission sections electrically couple to M antenna elements of the plurality of antenna elements.

Example 20 includes the subject matter of any of Examples 16-19, and further includes wherein a bandwidth of the combined channel is the same as a bandwidth of the first channel or the bandwidth of the combined channel is the bandwidth of both the first and second channels.

Example 21 includes the subject matter of any of Examples 16-20, and further includes a plurality of IC chips, wherein the IC chip is included in the plurality of IC chips and each IC chip of the plurality of IC chips is configured to provide signals to be transmitted on a different subset of antenna elements of the plurality of antenna elements.

Example 22 includes the subject matter of any of Examples 16-21, and further includes wherein the communication node comprises a satellite, a user terminal, a gateway, a repeater, or a communication node of a satellite communication system.

Example 23 is a method for transmitting data signals, the method including, in response to receiving a first plurality of data signals in a first channel, generating an encoded digital first plurality of data signals by encoding each data signal of the first plurality of data signals with a respective time delay and phase; in response to receiving a second plurality of data signals in a second channel, generating an encoded digital second plurality of data signals by encoding each data signal of the second plurality of data signals with a respective time delay and phase; combining the encoded digital first plurality of data signals and the encoded digital second plurality of data signals to generate a combined channel signal having a bandwidth that is a function of a bandwidth of one or both of the first or second channel; applying digital-to-analog conversion to the combined channel signal to generate an analog combined channel signal; up converting the analog combined channel signal to generate a radio frequency (RF) signal based on the analog combined channel signal; and wirelessly transmitting the RF signal.

Example 24 includes the subject matter of Example 23, and further includes wherein combining the encoded digital first plurality of data signals and the encoded digital second plurality of data signals to generate a combined channel signal comprises each data signal of the encoded digital first plurality of data signals and the encoded digital second plurality of data signals located in a same frequency range of the combined channel signal.

Example 25 includes the subject matter of any of Examples 23-24, and further includes wherein combining the encoded digital first plurality of data signals and the encoded digital second plurality of data signals to generate a combined channel signal comprises each data signal of the encoded digital first plurality of data signals located in a first frequency range of the combined channel signal and each data signal of the encoded digital second plurality of data signals located in a second frequency range of the combined channel signal.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

What we claim is:

1. An apparatus comprising:
 a first plurality of digital beamformers associated with a first channel, the first plurality of digital beamformers configured to encode each data beam of a first plurality of data beams of the first channel with a respective time delay and phase to generate an encoded first plurality of data beams;
a second plurality of digital beamformers associated with a second channel different from the first channel, the second plurality of digital beamformers configured to encode each data beam of a second plurality of data beams of the second channel with a respective time delay and phase to generate an encoded second plurality of data beams;
a channel combiner, electrically coupled to the first and second plurality of digital beamformers, and configured to generate a combined channel comprising an aggregation of at least a portion of the encoded first plurality of data beams and at least a portion of the encoded second plurality of data beams, wherein the combined channel has a bandwidth that is a function of a bandwidth of one or both of the first or second channel; and
a radio frequency (RF) transmission section, electrically coupled to the channel combiner, and configured to generate an output signal to be provided to a transmitting antenna based on the combined channel, wherein the RF transmission section includes a digital-to-analog converter (DAC) and a mixer.

2. The apparatus of claim 1, further comprising first and second digital mixers electrically coupled between the channel combiner and respective first and second plurality of digital beamformers, and wherein the first digital mixer is configured to shift a first central frequency associated with the first channel and the second digital mixer is configured to shift a second central frequency associated with the second channel.

3. The apparatus of claim 1, wherein the plurality of first and second plurality of data beams comprise 2N data beams and each of the first and second plurality of digital beamformers comprises N digital beamformers, and further comprising:
a plurality of channel combiners electrically coupled to the first and second plurality of digital beamformers, wherein the plurality of channel combiners comprises M channel combiners and the channel combiner is included in the plurality of channel combiners; and
a plurality of RF transmission sections electrically coupled to the plurality of channel combiners, wherein the plurality of RF transmission sections comprises M RF transmission sections and the RF transmission section is included in the plurality of RF transmission sections, wherein the plurality of RF transmission sections is configured to generate M output signals, and wherein the plurality of RF transmission sections electrically couple to M antennas of a phased array antenna to provide the M output signals for transmission.

4. The apparatus of claim 1, wherein at least one particular digital beamformer of the first plurality of digital beamformers or at least one particular digital beamformer of the second plurality of digital beamformers is dynamically disabled with a zero gain setting if the data beam associated with the at least one particular digital beamformer comprises inactive data, null data, is missing data, or data not to be transmitted.

5. The apparatus of claim 1, wherein the bandwidth of the combined channel is the same as the bandwidth of the first channel or the bandwidth of the combined channel is the bandwidth of both the first and second channels.

6. The apparatus of claim 1, further comprising an antenna element electrically coupled to the RF transmission section and configured to transmit the output signal.

7. The apparatus of claim 6, wherein the antenna element is an antenna element of a plurality of antenna elements comprising a phased array antenna.

8. An apparatus comprising:
a first plurality of digital beamformers associated with a first channel, the first plurality of digital beamformers configured to encode each data beam of a first plurality of data beams of the first channel with a respective time delay and phase to generate an encoded first plurality of data beams;
a second plurality of digital beamformers associated with a second channel different from the first channel, the second plurality of digital beamformers configured to encode each data beam of a second plurality of data beams of the second channel with a respective time delay and phase to generate an encoded second plurality of data beams; and
a plurality of channel combiners electrically coupled to the first and second plurality of digital beamformers, wherein each channel combiner of the plurality channel combiners is configured to generate a combined channel comprising an aggregation of at least a portion of the encoded first plurality of data beams and at least a portion of the encoded second plurality of data beams, wherein each combined channel has a bandwidth that is a function of a bandwidth of one or both of the first or second channel, and wherein each combined channel is to be transmitted on an antenna of a phased array antenna.

9. The apparatus of claim 8, further comprising first and second plurality of digital mixers, wherein the first plurality of digital mixers are electrically coupled between the first plurality of digital beamformers and the plurality of channel combiners and the second plurality of digital mixers are electrically coupled between the second plurality of digital beamformers and the plurality of channel combiners, and wherein each digital mixer of the first plurality of digital mixers is configured to shift a first central frequency associated with the first channel and each digital mixer of the second plurality of digital mixers is configured to shift a second central frequency associated with the second channel.

10. The apparatus of claim 8, wherein the first and second plurality of data beams comprise 2N data beams, each of the first and second plurality of digital beamformers comprises N digital beamformers, and the plurality of channel combiners comprises M channel combiners, and further comprising a plurality of RF transmission sections electrically coupled to the plurality of channel combiners, wherein the plurality of RF transmission sections comprises M RF transmission sections, and wherein the plurality of RF transmission sections electrically couple to M antennas of the phased array antenna.

11. The apparatus of claim 8, wherein the bandwidth of the combined channel is the same as the bandwidth of the first channel or the bandwidth of the combined channel is the bandwidth of both the first and second channels.

12. The apparatus of claim 8, wherein the apparatus comprises an integrated circuit (IC) chip.

13. The apparatus of claim 8, wherein at least one particular digital beamformer of the first plurality of digital beamformers or at least one particular digital beamformer of the second plurality of digital beamformers is dynamically disabled with a zero gain setting if the data beam associated with the at least one particular digital beamformer comprises inactive data, null data, is missing data, or data not to be transmitted.

14. The apparatus of claim 8, wherein each data beam of the at least a portion of the encoded first plurality of data beams and the at least a portion of the encoded second plurality of data beams is located in a same frequency range of the combined channel.

15. The apparatus of claim 8, wherein each data beam of the at least a portion of the encoded first plurality of data beams is located in a first frequency range of the combined channel and each data beam of the at least a portion of the encoded second plurality of data beams is located in a second frequency range of the combined channel.

16. A communication node of a communications system, the communication node comprising:
 a plurality of antenna elements arranged in an antenna lattice; and
 an integrated circuit (IC) chip comprising:
 a first plurality of digital beamformers associated with a first channel, the first plurality of digital beamformers configured to encode each data beam of a first plurality of data beams of the first channel with a respective time delay and phase to generate an encoded first plurality of data beams;
 a second plurality of digital beamformers associated with a second channel different from the first channel, the second plurality of digital beamformers configured to encode each data beam of a second plurality of data beams of the second channel with a respective time delay and phase to generate an encoded second plurality of data beams;
 a channel combiner, electrically coupled to the first and second plurality of digital beamformers, and configured to generate a combined channel comprising an aggregation of at least a portion of the encoded first plurality of data beams and at least a portion of the encoded second plurality of data beams; and
 a radio frequency (RF) transmission section, electrically coupled to the channel combiner, and configured to generate an output signal to be provided to an antenna element of the plurality of antenna elements based on the combined channel, wherein the RF transmission section includes a digital-to-analog converter (DAC) and a mixer, and wherein power requirement of the system is reduced by 20-30% relative to a system that transmits the first and second plurality of data beams in more than one channel.

17. The communication node of claim 16, further comprising first and second digital mixers electrically coupled between the channel combiner and respective first and second plurality of digital beamformers, and wherein the first digital mixer is configured to shift a first central frequency associated with the first channel and the second digital mixer is configured to shift a second central frequency associated with the second channel.

18. The communication node of claim 17, wherein the first digital mixer is configured to shift the first central frequency by $\Delta f$ and the second digital mixer is configured to shift the second central frequency by $-\Delta f$.

19. The communication node of claim 16, wherein the first and second plurality of data beams comprise 2N data beams and each of the first and second plurality of digital beamformers comprises N digital beamformers, and further comprising:
 a plurality of channel combiners electrically coupled to the first and second plurality of digital beamformers, wherein the plurality of channel combiners comprises M channel combiners and the channel combiner is included in the plurality of channel combiners; and
 a plurality of RF transmission sections electrically coupled to the plurality of channel combiners, wherein the plurality of RF transmission sections comprises M RF transmission sections and the RF transmission section is included in the plurality of RF transmission sections, and wherein the plurality of RF transmission sections electrically couple to M antenna elements of the plurality of antenna elements.

20. The communication node of claim 16, wherein a bandwidth of the combined channel is the same as a bandwidth of the first channel or the bandwidth of the combined channel is the bandwidth of both the first and second channels.

21. The communication node of claim 16, further comprising a plurality of IC chips, wherein the IC chip is included in the plurality of IC chips and each IC chip of the plurality of IC chips is configured to provide signals to be transmitted on a different subset of antenna elements of the plurality of antenna elements.

22. The communication node of claim 16, wherein the communication node comprises a satellite, a user terminal, a gateway, a repeater, or a communication node of a satellite communication system.

* * * * *